(No Model.) 2 Sheets—Sheet 1.
J. H. STROMYER.
POISE FOR PLATFORM SCALES.
No. 445,825. Patented Feb. 3, 1891.
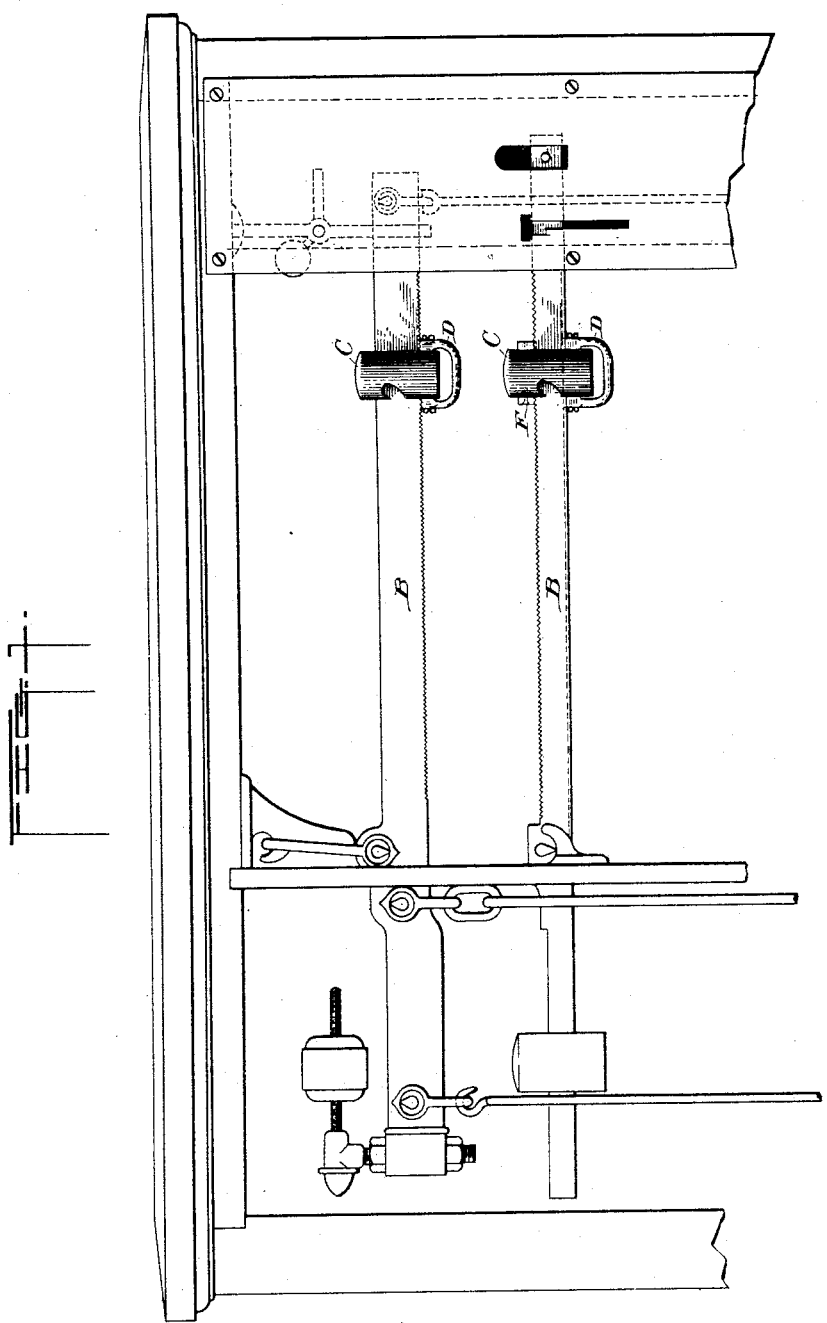
WITNESSES
T. A. Conner Jr.
E. R. Conner
INVENTOR
John H. Stromyer
by Charles S. Sturtevant,
atty.

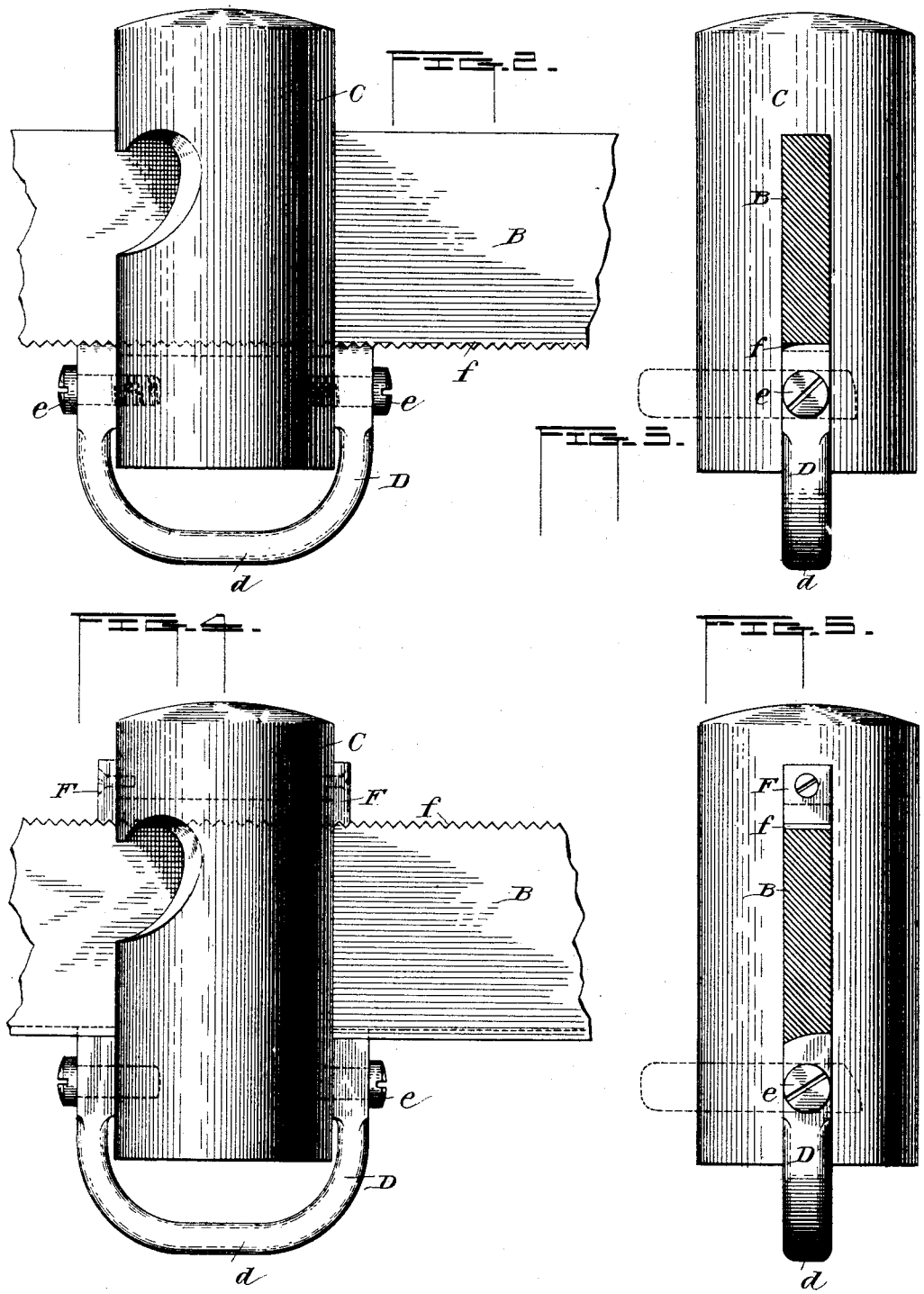

UNITED STATES PATENT OFFICE.

JOHN H. STROMYER, OF BALTIMORE, MARYLAND, ASSIGNOR TO E. & T. FAIRBANKS & COMPANY, OF ST. JOHNSBURY, VERMONT.

POISE FOR PLATFORM-SCALES.

SPECIFICATION forming part of Letters Patent No. 445,825, dated February 3, 1891.

Application filed September 20, 1890. Serial No. 365,606. (No model.)

*To all whom it may concern:*

Be it known that I, JOHN H. STROMYER, a citizen of the United States, residing at Baltimore, in the State of Maryland, have invented certain new and useful Improvements in Poises for Platform-Scales; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to an improvement in sliding weights or poises used on the weighing arms or beams of platform-scales, and more especially to the manner of securing the same at the desired points on said beams.

In the use of ordinary platform-scales it is frequently desirable to fasten the adjustable poise in a certain position upon the beam for an indefinite length of time; but in the use of what are known as "stock-charging" or "ingredient" scales after the poises have been adjusted to their proper positions it is essential for them to be so securely fastened as to be incapable of displacement by jarring or accidental blows.

Heretofore it has been the custom to secure the sliding weight or poise by means of a set-screw or thumb-nut passing through the same and bearing upon the scale-beam. Such an arrangement is, however, defective, particularly when applied to the special classes of platform-scales above mentioned, by reason of the liability of the set-crew to become loose or even drop out altogether, thereby rendering the poise liable to displacement if jarred or struck accidentally.

It is the object, therefore, of the present invention to overcome the heretofore existing defects and provide a device by the use of which the likelihood of accidental displacement of the poise is reduced to a minimum.

The invention therefore consists in the matters hereinafter described, and pointed out in the appended claims.

In the accompanying drawings, Figure 1 is a view in elevation of a portion of a scale embodying my invention. Fig. 2 is an enlarged view of a portion of Fig. 1, showing one adaptation of my invention, a portion of the scale of the beam being broken away. Fig. 3 is a view looking toward the right of Fig. 2, the scale-beam being shown in section. Figs. 4 and 5 are views similar to Figs. 2 and 3, but illustrating a different form of my invention.

In the drawings, in which like letters indicate like parts, A represents a platform-scale of one of the well-known Fairbanks type, and B the weighing-beams thereof supported in the manner shown.

C represents the sliding weight or poise with which each beam is provided, and, as above stated, it is to the particular means for securing the same upon the beams that the present invention relates.

Referring now particularly to Figs. 2 and 3, D is the attachment for securing the poise upon the scale-beam. It consists of a yoke $d$, secured to the bottom of the poise by means of screws $e\ e$, passing through the yoke near its ends and upon which it plays, having a limited movement at right angles to that of the poise. It is preferably made of such weight as to normally remain in a vertical position. The parts of the yoke above the securing-screws $e$ are of such length as when in a vertical position to bear against the lower edge of the scale-beam.

To prevent displacement of the poise, I make the ends of the yoke cam-shaped, as shown clearly in Fig. 3, the action of which upon the beam in the movement of the yoke toward a vertical position will tend to crowd the poise upon the beam and hold it very securely; but in order to obtain greater security I provide the lower edge of the scale-beam and the ends of the yoke with notches $f$, adapted to engage. It will be obvious that the cams upon the ends of the yoke may be dispensed with and the poise prevented from displacement merely by engagement of the notched beam and ends of the yoke, or the edge of the beam may be cam-shaped instead of the yoke.

In Figs. 4 and 5 a slightly-different form of my invention is shown. In said figures the notches upon the lower edge of the beam and the ends of the yoke are dispensed with, the attachment D being made to come firmly against the said lower edge of the beam. The upper edge of the beam is, however, provided with notches *f*, the poise having secured to its upper portion one or more gibs F, fitting within the notches, thus holding the poise in place.

The operation of both forms of my invention is similar. The attachment is thrown at right angles to the line of movement of the poise, as shown in dotted lines, the sliding poise is moved to any desired point, and then by removing the hand the weight of the attachment throws it into place automatically, thus, as in Figs. 2 and 3, forcing the notches on the ends of the yoke into engagement with those on the lower edge of the beam, or, as in Figs. 4 and 5, forcing the gibs F into engagement with the notches in the upper edge of the beam, thereby securing the weight in the desired position, so that it cannot be moved until the attachment is operated as before.

I am aware that it has been heretofore proposed to pivot upon a poise, so as to have movement in the same line with the poise, a spring-pawl adapted to bear in the notches of a scale-beam and prevent movement in one direction; but never, so far as I am aware, has it been proposed to pivot upon a sliding poise a swinging attachment automatically operating to normally hold the poise in position on the scale-beam.

It will be readily seen that the attachment D may be made to apply to one side of the poise only, and that the poise shown may be applied to any ordinary scale-beam. I consider the two forms herein illustrated as embodying my invention equivalents, and do not therefore desire to be understood as being limited to the precise details herein shown and described, as various minor changes and modifications might be made without departing from the spirit of my invention.

Having thus described my invention, what I claim, and desire to secure by Letters Patent, is—

1. The combination, with a scale-beam, of a poise sliding thereon, said poise being provided with an automatically-operated swinging attachment normally holding the poise in position upon the scale-beam, substantially as described.

2. The combination, with a scale-beam, of a poise sliding thereon and a gravity operating swinging attachment pivoted to said poise and normally acting to hold the same in position upon the scale-beam, substantially as described.

3. In combination with a scale-beam, a sliding poise thereon and an attachment pivoted to the poise, the pivot-points thereof being so arranged that movement at right angles to that of the poise is given the attachment, said attachment normally bearing against the scale-beam, substantially as described.

4. In combination with a scale-beam having a notched edge, a sliding poise thereon and an attachment pivoted to the poise to swing in a direction at right angles to the line of movement of the poise, the upper part of said attachment being cam-shaped and normally bearing against the scale-beam, substantially as described.

5. In combination with a scale-beam having a notched edge, a poise sliding thereon and an attachment pivoted to said poise provided with notched cam-shaped ends and adapted to bear against the scale-beam, the notches on the attachment registering with those of the beam, substantially as described.

6. In combination with a scale-beam having a notched lower edge, a yoke, as D, and screws pivotally securing said yoke to the poise, the ends of the yoke above the pivot-points being notched to engage the notches in the lower edge of the beam, substantially as described.

7. As a new article of manufacture, a poise for scale-beams having a swinging yoke secured to it, said yoke serving as a handle to move the poise and adapted to bear against the edge of the scale-beam.

In testimony whereof I affix my signature in presence of two witnesses.

JOHN H. STROMYER.

Witnesses:
JOHN G. DOON,
JOHN R. MEGINNIS.